Feb. 11, 1964   E. F. MACKS   3,121,179
NONCONTACTING DIRT SEAL FOR AN ELECTRIC MOTOR
Filed Jan. 14, 1959   2 Sheets-Sheet 1

INVENTOR.
ELMER FRED MACKS
BY Pyle & Fisher
ATTORNEYS

Feb. 11, 1964  E. F. MACKS  3,121,179
NONCONTACTING DIRT SEAL FOR AN ELECTRIC MOTOR
Filed Jan. 14, 1959  2 Sheets-Sheet 2

INVENTOR.
ELMER FRED MACKS
BY *Pyle & Fisher*
ATTORNEYS

United States Patent Office 3,121,179
Patented Feb. 11, 1964

3,121,179
NONCONTACTING DIRT SEAL FOR AN
ELECTRIC MOTOR
Elmer Fred Macks, Willow Lane, Vermilion, Ohio
Filed Jan. 14, 1959, Ser. No. 786,856
21 Claims. (Cl. 310—90)

This invention relates to gas lubricating mechanisms and more particularly to a noncontacting dust sealing means for such a mechanism.

Gas bearings, which are sometimes referred to as "air bearings," are a relatively old art. The concept that air or other gas can serve as the lubricant to keep two relatively rotating elements in spaced relationship is now well known. Such bearings have had extremely limited use even in the laboratory and until relatively recently there has been practically no commercial use. One of the principal reasons that air bearings have not been used commercially is that they have been extremely susceptible to premature failure caused by collection of dirt in the air film region.

The permissible tolerances in the formation of pneumodynamic air bearings are very precise. The complemental surfaces which define a load carrying fluid film region must be machined to very close tolerances and clearance spaces in gas or pneumodynamic bearings are generally quite small. Accordingly, collections of relatively small amounts of dirt in the region between the closely spaced surfaces can result in failure.

Air bearings normally have an access opening in at least one dimensional extremity of the fluid film region. This access opening is so termed because it provides access to the ambient atmosphere. The ambient atmosphere and the fluid film region are in communication with one another through the access opening. It has been discovered that it is possible to construct a noncontacting seal which will mitigate or prevent the entrance of dust particles through the access opening and thereby control the collection of dust in the fluid film region. This is accomplished by controlling the characteristics of the static electricity in the region of the access opening, which static electricity, in the absence of such control, attracts dust to the access opening and permits its passage into the fluid film region.

This invention relates more particularly to pneumodynamic gas or air bearings which generate a load carrying gas film within the bearing as contrasted with the class of pneumostatic gas or air bearings, which are supplied by an externally pressurized gas in order to support a load.

Accordingly, one of the principal objects of this invention is to provide a novel and improved noncontacting seal for use with an air film mechanism, which seal comprises means to control the static electricity in an access opening to the fluid film region of the bearing in such a manner as to exclude the passage of dust particles through said opening into the fluid film region.

A related object of the invention is to provide a novel and improved noncontacting seal in the form of means adjacent the access opening to charge dust particles with static electricity and thereafter repel dust particles.

A related specialized object of the invention is to provide a noncontacting seal around the access opening which comprises an electrical insulating material, which insulating material will carry a static charge which, first attracts any oppositely charged dust particles, second, transmits a like charge to the dust particles upon contact and third, then repels the dust particles because of the like charge.

Another more specialized object of the invention is to provide a noncontacting seal comprising a ring of radioactive material at one extremity of the access opening, which radioactive material will eliminate a build-up of static electricity.

Another more specialized object of the invention is to provide dust control means through static electricity in the form of the provision of a static charge which will attract dust particles out of the access opening.

Another object of the invention is to provide a plurality of serially related access openings along an access passage to the ambient environment and static electricity control means at one or more such openings to cause the gas from the ambient atmosphere to follow a tortuous path to the bearing region through one or more of such noncontacting dust seals.

Other objects and a fuller understanding of the invention may be had by referring to the following description and claims, taken in conjunction with the accompanying drawings, in which:

Figure 1:
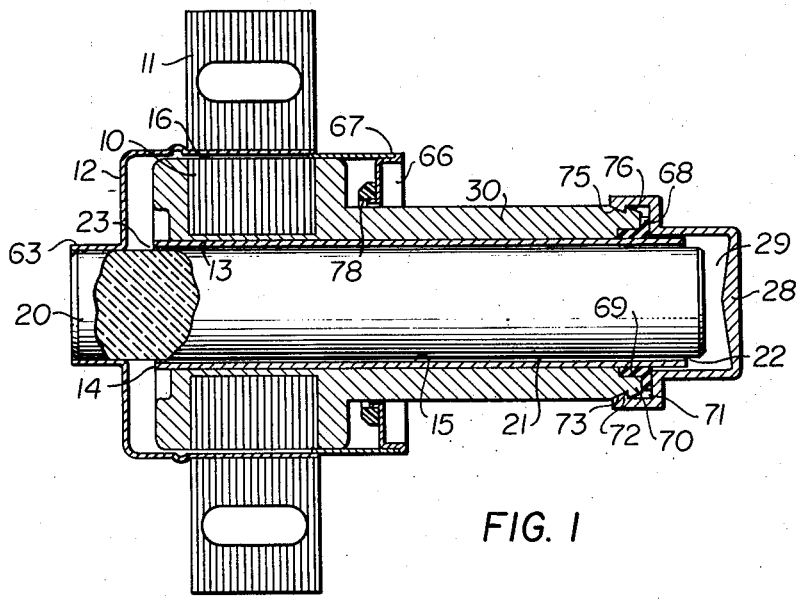
FIGURES 1 and 2 are sectional views of a dynamoelectric machine in which the stator carries a cartridge unit, which unit includes rotor, bearing, and dust control means.

Each of the drawings discloses a dynamoelectric machine in which the rotating components are totally supported on a film of gas when the device is in operation. These motors are of the class more completely defined in copending application for patent Serial Number 643,666, filed March 4, 1957, under the title "Air Supported Rotor," now United States Patent Number 2,889,474, issued June 2, 1959, in copending application for patent, Serial No. 578,536, filed April 16, 1956, under the title Fluid Dynamic Device, now United States Patent No. 2,916,642 issued December 8, 1959. Patent 2,983,822 issued May 1, 1961, and the other copending applications for patent and patents cross referenced in these patents are also pertinent.

An exhaustive series of tests have been conducted with these motors in which some of the motors included the features of this invention and in which other motors did not. To date over 250,000 hours of running time have been accumulated. On accelerated start and stop tests equivalent to twenty starts and stops a day, motors incorporating these discoveries have operated for the equivalent of over 100 years. During these tests motors which did not incorporate these features were placed immediately adjacent the improved motors and subjected to an identical number of starts and stops. At the conclusion of the tests the improved motors were completely free of dirt and showed no measurable signs of wear. In each such improved motor, the starting torque appeared to be completely unaffected and the starting voltage was the same as it had been at the beginning of the tests. Under the conditions of those comparative tests the motors which did not incorporate the discoveries of this invention required high starting and operating voltage, and had poor torque and in some cases failed to start. Airborne dust which had entered the air bearing was the cause of difficulty.

The exhaustive tests which have been conducted indicate that it is possible to mitigate the ingress of dirt into an air bearing film region so completely as to practically, if not completely, eliminate dirt. The result is that it is now possible to construct an air bearing which, under even adverse conditions, has a life expectancy measured in decades.

The explanation for this phenomenal improvement appears to be in controlling static electrically built-up in the relatively rotating elements. In motors of this class static electricity charges are built-up which are very small but nonetheless attract dirt particles. The static electricity charges are so small that grounding charged elements will not eliminate the charges. As will be more apparent from the following detailed description, it is possible to control this static electricity by controlling its intensity, by neutralizing it, and in at least some instances it is also possible to use the static electricity to advantage in reducing or eliminating entry of dirt particles into the fluid film region.

In the drawings, the present invention is shown as applied to an electric motor. It is, of course, equally applicable to any rotating machine in which a gas bearing is used.

Referring now to the drawings, in each of FIGURES 1 through 4 a rotor 10 and a stator 11 are shown. In each case the rotor and stator 10, 11 comprise the electrical components of an electric induction motor. In the disclosed arrangement the rotor 10 is the armature and the stator 11 is the field. The rotor 10 is disposed in an axial stator bore 16. A bracket 12 is fixed to the stator 11 in a manner which will prevent gas from the ambient atmosphere from passing between the stator 11 and bracket 12. The armature 10 has a through axial bore 13 which receives a sleeve or bushing. The sleeves are designated by the numerals 14, 24, 34 and 44 in FIGURES 1 through 4 respectively. Each of the sleeves is fixed to the rotor 10 so they each preferably form a part of the rotor. Each of the sleeves is a tubular having a cylindrically contoured inner surface. The inner surfaces of the sleeves 14, 24, 34 and 44 are designated by the numerals 15, 25, 35 and 45 respectively.

A pin 20, which might be referred to as a stationary shaft, is affixed to the bracket 12. The pin 20 in each case projects into and preferably through the sleeve and therefore through the bores of both the rotor and stator 10, 11. The pin 20 is preferably made of a hard, insulating material for reasons that will subsequently be described in more detail. The preferred and disclosed material is glass. Glass is preferred because it is an excellent insulator which has good dimensional stability, is relatively impervious to attack by humidity and acids, has good friction and wear properties for the application involved and is low in cost and relatively easy to form to the required close tolerances. The pin 20 has a cylindrically contoured outer surface 21 which is complemental in each case to the respective rotor-sleeve inner surfaces 15, 25, 35 and 45.

A load carrying, gas film region 22 is defined by the pin surface 21 and the various sleeve inner surfaces of the drawings. For clarity of illustration the radial dimensions of the region 22 have been greatly exaggerated. An actual operable clearance may be of the order of 0.0005 inch per inch of diameter as is more clearly set out in the cross referenced applications. The region 22 may be referred to as a pneumodynamic film region. The bearings disclosed in each of these figures are radial load carrying bearings of the fluid dynamic type. Since they are gas bearings, they are referred to as pneumodynamic bearings.

Pneumodynamic bearings are air bearings in which the load-carrying film is generated by the coaction of the complemental bearing surfaces upon relative rotation of the elements. In such a bearing, regions of positive and negative pressure are built-up at circumferentially spaced locations. In those regions where there is negative pressure the pressure of the ambient atmosphere may force ambient gas itno the regions. In those areas where there is positive pressure, gas may be forced out of the fluid film region. Also during start and stop operations temperature differences between the gas film region and the ambient gas may cause flow into or out of the fluid film region of the pneumodynamic bearing. Accordingly, bearings of the pneumodynamic type are referred to as bearings which "breathe." Since they breathe, they must communicate with the ambient atmosphere through some access opening. In the structures shown in the drawings there is, in each case, one direct access opening to the fluid region 22. This direct access opening is, in each case, designated by the numeral 23.

In the constructions shown an end cap 28 is affixed to the end of each of the sleeves 14, 24, 34 and 44 at the end which is remote from the access opening 23. The end cap 28 seals off the outer end of the fluid film region 22. A quantity of gas is trapped in a cavity 29 defined in part by the end cap 28. The air trapped in the cavity 29 serves to give axial stability to the device. The features of this concept of axial stability or location are disclosed more completely in copending application for patent Serial Number 700,651, filed December 4, 1957, under the title "Dynamoelectric Device," now U.S. Patent 2,928,960 issued March 15, 1960.

It will be recognized that this device would be operable without the end cap 28. Many journal bearings are open at both ends and thrust bearings are open at both peripheral extremities. In either of these cases static electricity control means corresponding to the control means disclosed herein are provided at each such opening and the openings are normally found at dimensional extremities of the fluid film region.

Referring now to FIGURE 1, a sleeve 14, like the pin 20, is made of a hard, insulating material which is preferably glass. The sleeve 14 is surrounded by the rotor 10 which includes an outer supplemental, reenforcing sleeve portion 30. The sleeve 14 and rotor are fixed together in a manner which will subsequently be described in more detail. The reenforcing sleeve 30 is provided to facilitate the connection of the end cap 28 as well as to protect the glass sleeve 14. In this embodiment the static electricity control means takes the form of the glass pin 20 and the glass sleeve 14.

Figure 2:
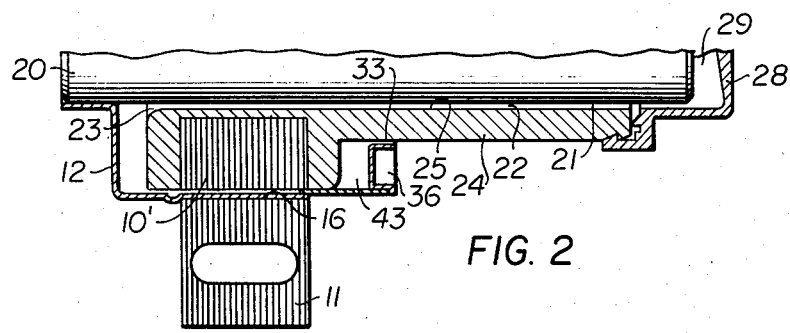

The constructions of FIGURES 1 and 2 each have a novel feature in the form that a cartridge unit consisting of the embodiment described herein may be snapped into the bore 16 of the stator 11. A die cast rotor 10 is provided which includes the reenforcing or supplemental sleeve 30 as an integral part or extension thereof. The sleeve 14 fits snugly but nonetheless freely into the rotor 10 and the supplemental sleeve extension 30. The housing bracket 12 projects through the bore 15 of the stator.

In assembly the pin 20 is press connected to an end wall 63 of the bracket 12. Next the glass sleeve 14 is pressed into the bore 13 and temporarily held in place by retaining washer 68 which is made of a soft, flexible and pliable material, such as synthetic rubber. The rotor-sleeve assembly is slid over the pin and an annular flanged insert 66 is snapped into end 67 of bracket 12. An end cap 28 is then positioned over the end of the supplemental sleeve 30 in such a fashion as to squeeze the retainer 68 between a shoulder 71 on the end cap and the end 70 of the sleeve extension. Assembly in the manner described allows a precision bore sleeve 14 to be employed and eliminates the need for refinishing of the sleeve bore after assembly as is necessary if the sleeve is a press fit in the rotor 10.

The end cap 82 is a snap on member made of a suitable resilient material such as nylon. The end cap 28 has a locking ring portion 72 which is somewhat tooth shaped in cross section. The locking ring 72 is retained in a retaining groove 73 formed in the periphery of the supplemental sleeve 30. The supplemental sleeve 30 and the cap 28 include complemental camming surfaces 75, 76 respectively. The camming surfaces 75, 76 cause the tooth shape locking ring portion 72 to be flared radially outwardly when the end cap is telescoped over the end of the supplemental rotor 30. The ring then snaps inwardly into the retaining groove 73 to hold the end cap 28 in place with the annular washer member 68 squeezed between the end 69 and the shoulder 71 causing an airtight seal.

An annular rub ring 78 may be fixed to the retaining end cap 66. The rub ring has as its primary function the elimination of noise on starting and stopping of the motor if the rotor 10 has shifted axially until it contacts the ring 78 as may happen in a vertical application after a long shut down. As soon as the motor is started up, the magnetic field will draw the rotor into position and provide axial location.

It will be seen that the entire assembly of FIGURE 1, other than the stator 11, is a cartridge unit. This cartridge unit is simply snapped into the bore 16 of the stator 11 for assembly. It may be removed by the same technique. The assembly provides great flexibility of manufacture in which one rotor and bearing assembly, which includes means to control the static electricity, can be used with any of a wide variety of stators so long as the bore in the stator is of the appropriate size. It provides a simple, tamper proof, compact assembly which at the same time permits optimum availment of the modifications taught in each of the embodiments of this application.

Glass is an insulating material. The insulating material will build-up and retain a charge of static electricity. Dust particles of like charge will be repelled and therefore will not enter the opening 23. Dust particles of opposite charge will be attracted to either the pin or sleeve and then be repelled. When an oppositely charged dust particle comes in contact with an insulating material that carries a charge of static electricity it assumes a like charge. The dust particle having once assumed the like charge is repelled.

This phenomenon is believed to explain one reason why dust does not pass through the direct access aperture 23. Dust particles are either immediately repelled or charged and then repelled depending on their original polarity. The outlined tests and others indicate that an air bearing for the subject application having both members made with glass components has a life expectancy which for all practical purposes is measured in terms of decades. Also, a contributing factor is that similar mating materials build-up less contact static electrical charge than dissimilar mating materials. Most similar mating metals tend to wear and gall when rubbed during start and stop. Certain similar ceramic materials have less tendency to gall and wear during start and stop. Glass vs. glass and $Al_2O_3$ vs. $Al_2O_3$ are two possible examples of similar mating materials suitable for gas film bearings. Glass vs. glass has undergone extensive and conclusive verification testing and theoretical indications are that $Al_2O_3$ in the form of a hard anodized oxide coating over aluminum is equally suitable.

An example of an anodized coating is shown in FIGURE 2. The rotor 10' is a die cast rotor, as shown in the preferred arrangement in the other drawings. Through this construction the rotor 10' and sleeve 24 are integrally formed as one element. This inner surface 25 of the sleeve-rotor 24—10' is hard anodized to provide a hard insulating surface which, in conjunction with a hard anodized pin, from theoretical considerations act in the same fashion as previously described.

Figure 3:
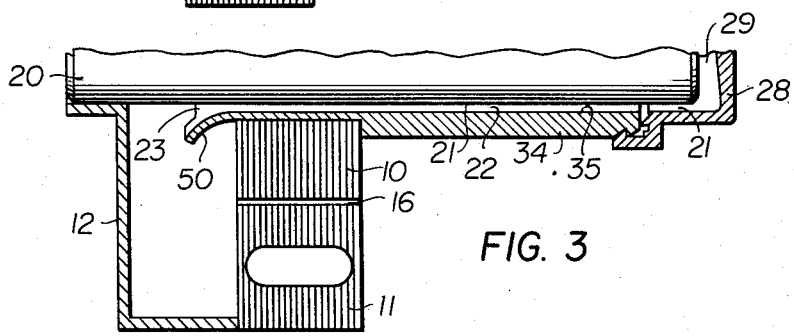
FIGURES 3 and 4 are sectional views of dynamoelectric machines showing dust control means which may be alternate or additional to the means shown in FIGures 1 and 2; and, FIGURE 5 is an end view of the sleeve of FIGURE 3, showing, in cross section, a pin positioned in the sleeve.

In FIGURE 3 another structure for controlling static electricity in the region of the direct access opening 23 is shown. There the sleeve 34 is disclosed as an electrically conductive material such as brass or stainless steel. While test data cited below will show that a construction in which both pin and sleeve are insulators is far superior, dirt control satisfactory for noncritical continuous running applications can be obtained with the construction of FIGURES 3 and 5. Further, means of FIGURES 3 and 5 will enchance dust control in the embodiments of FIGURES 1 and 2 for certain critical applications. As will be seen from data to follow, start and stop tests are far more critical than continuous tests from the standpoint of attracting dust in the air bearing region.

The metallic sleeve 34 has a radially outwardly flared end 50 at its left hand end as viewed in FIGURE 3. The flared end 50 surrounds the access opening 23. If the pin 20 is negatively charged, the metal sleeve 34 will be positively charged. A positively charged conductor tends to attract and collect oppositely charged particles. Accordingly, dirt entering the access opening 23 which has a charge opposite from the sleeve 34 will be attracted to the sleeve. Dirt carrying a like charge to the sleeve 34 will be repelled by it and attracted by the oppositely charged pin 20. Since the pin 20 is of an insulating material, it transmits to the attracted particle a like charge and thereafter repels it. Once repelled and carrying a charge like the pin, the dirt particle is attracted and retained by the oppositely charged sleeve 34.

Static electricity tends to collect and concentrate at corners of objects. Accordingly, the flared end 50 is formed with corners 51 which carry the highest static charges. The corners 51 of the sleeve 34 are remote from the region 22. Since the corners 51 carry the strongest charge, they tend to attract dirt out of the access aperture 23 in the fashion which has previously been described. Further, centrifugal force tends to throw off, and thus clean, the bore of the flare of flange 50 where dust particles can collect if they manage to by-pass the sharpest corners of the flange.

Figure 4:
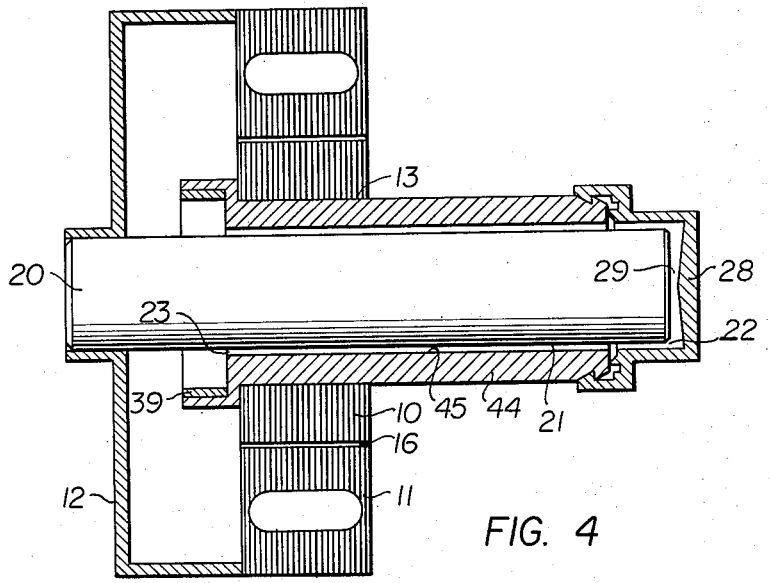

In FIGURE 4 a modified form of static electricity control is shown. In this modification, a quantity of radio-active material 39 in the form of radioactive polonium is carried by the sleeve 44 adjacent to the access opening 23. The sleeve 44 is preferably stainless steel. Polonium is preferably in the form of an annular ring which surrounds the access opening 23. The phenomenon is not fully understood, but it is now known that radioactive polonium has the characteristic of mitigating and in some cases eliminating static electricity. Once static electricity is reduced dirt particles are not attracted into the access opening 23 and therefore the flow of dirt into the region 22 is mitigated. Polonium-210 is a presently preferred radio-active material for this application.

The embodiment of FIGURE 2 has a supplemental serially related access aperture 33 which may be provided in applications having extremely dirty conditions. The suplemental access aperture 33 is defined by the exterior of the bracket 12, sleeve portion 24, and an annular flange insert 36 which is carried by the bracket 12. The insert 36 is similar to the previously described insert 66. Communition between the serially related access openings 23, 33 is provided by the space between the rotor and bracket.

The sleeve portion 24 and the insert 36 may be made of insulating material to function like the pin and sleeve 20, 14. Alternately, as disclosed, the sleeve and insert 24, 36 each may be coated with a suitable insulating material, as by painting, anodizing, or printing. The insulating material coated on the insert 36 and sleeve portion repel dirt in the same way it is repelled by the pin and sleeve 21, 14. It will be seen that the insulating coatings in the supplemental access opening 33 may be used as the only dust control means if it is desired to eliminate the control means at 23. Such coatings may also be applied to the ends of the pin or sleeve formed like any of those shown but of conduction material.

Figure 5:
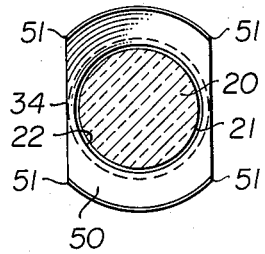

FIGURE 5 is a partial cross sectional view of the device of FIGURE 3 including an end view of the sleeve 34. As is best seen in that figure, the flare 50 is preferably cut away to form two "ears" and to provide four corners on edges 51. Thus, while the flare 50 may be an annulus, its enlarged end is preferably shaped to provide a plurality of sharp corners or edges 51.

The following representative performance figures will furnish some comparison with regard to the discoveries presented here. To date, over 250,000 hours of continuous and start-and-stop tests have been run. Each of the tests set out below are results on 10 watt shaded pole motors. Tests 1 and 3 are start-and-stop tests, while in Test 2, the motor was run continuously.

TEST 1

*Start and Stop Test*

GLASS PIN, STAINLESS STEEL SLEEVE

|  |  | No. of Start Cycles | Starting Voltage |
|---|---|---|---|
| Days | 1 | 3,530 | 40 |
|  | 2 | 3,530 | 45 |
|  | 3 | 3,530 | 85 |
|  | 4 | 3,530 | 70 |
|  | 5 | [1] 3,000 | [2] 85 |
| Totals |  | 5 days | [1] 17,000 |

[1] Approximately.
[2] Test Terminated due to high starting voltage.

TEST 2

*Continuous Running Test* [1]

GLASS PIN AND GLASS SLEEVE

|  |  | Start Voltage |
|---|---|---|
| Days | 1 to 236 | 45 to 50 each day (Maximum variation 5 volts). |
|  | 237 | 45 |
| Totals | 237 days | 47.5, average starting voltage (approximately). |

[1] Motors stopped once per day to measure voltage.

TEST 3

*Start and Stop Test*

GLASS PIN AND GLASS SLEEVE

|  |  | Total No. of Starting Cycles | Starting Voltage |
|---|---|---|---|
| Days | 1 to 241 | 3,530 per day. | 40 to 50 each day (maximum variation 10 volts). 50 |
|  | 242 | 3,530 |  |
| Totals |  | 242 days | 854,000 | 45, approximate average voltage. |

In the case of the Test 2 and 3, the motor were still 100 percent operative and running like new motors after the number of days indicated.

The motor of Test 1 was made in accordance with FIGURE 3, but without the corners 51. A similar motor without the flared end failed within 48 hours. A motor made in accordance with the construction of FIGURES 3 and 5 and including the corners 51 ran for over 30 days. This demonstrates the advantage of the flared construction. Many other tests of glass pins vs. brass and steel tubes with and without flared ends verify the beneficial effect of the flared ends, and particularly the flared combination with corners.

Tests Numbers 2 and 3 were the same as Test Number 1 except that a glass tube was substituted for the metal tube. The results vividly illustrate the superiority of glass vs. glass as the mating materials. Both the straight and flared glass tubes with and without sharp corners were evaluated. In all cases the results have been excellent as there has been no evidence of dust within any of the air bearings.

Static electric dust closures in series with the air bearing, such as illustrated in FIGURE 2, have proved effective by allowing runs of two to three months, and more, with the glass pin and stainless steel tube formed to the shape of the sleeve 14 of FIGURE 1.

While the invention has been described with a great deal of clarity and detail, it is believed that it essentially comprises novel and improved non-contacting dirt seals for use with an air bearing, which seals include means to control the static electricity in an access opening to a fluid film region of the bearing.

Although the invention has been described in its preferred form with a certain degree of particularity, it is understood that the present disclosure of the preferred form has been made only by way of example and that numerous changes in the details of construction of the combination and arrangement of parts may be resorted to without departing from the spirit and the scope of the invention as hereinafter claimed.

I claim:

1. In a dynamo-electric machine a gas film mechanism comprising first and second relatively rotatable elements having complemental surfaces defining a load carrying fluid film region therebetween, said elements defining between them as least one access opening, said film region being in communication with the ambient atmosphere through said opening, and at least one of said elements including means adjacent said opening to control the ingress of dirt into said region.

2. In a dynamo-electric machine a gas film mechanism comprising first and second relatively rotatable elements having complemental surfaces defining a load carrying fluid film region therebetween, said elements defining between them at least one access opening, said film region being in communication with the ambient atmosphere through said opening, and said elements including first and second annular portions of electrical insulating material defining two dimensional extremities of said access opening.

3. The device of claim 2 wherein said portions are formed of the same insulating material.

4. In a dynamo-electric machine a gas film mechanism comprising first and second relatively rotatable elements having complemental surfaces defining a load carrying fluid film region therebetween, said elements defining between them at least one access opening, said film region being in communication with the ambient atmosphere through said opening, and each of said elements including insulating means carried adjacent said opening to repel dust particles of like polarity and to attract particles of opposite polarity and thereafter to charge and repel such opposite particles as like particles.

5. The device of claim 4 wherein said insulating means comprises a coating of insulating material.

6. In a dynamo-electric machine a gas film mechanism comprising first and second relatively rotatable elements having complemental surfaces defining a load carrying fluid film region therebetween, said elements having at least one access opening, said region being in communication with the ambient atmosphere, and said elements including radioactive material carried adjacent said aperture to control the collection of static electricity.

7. In a dynamo-electric machine an air bearing comprising, an elongated glass pin having a cylindrically contoured portion, and a relatively rotatable tubular bushing element having a cylindrically contoured inner surface complemental to said pin portion, said portion and surface defining a load carrying pneumodynamic film producing region therebetween, said tubular bushing element being glass.

8. In a dynamo-electric machine an air bearing comprising, an elongated glass pin having a cylindrically contoured portion, and a relatively rotatable tubular bushing element having a cylindrically contoured inner surface complemental to said pin portion, said portion and surface defining a load carrying pneumodynamic film producing region therebetween, said bushing having a flared end portion, said flared end being flared radially outwardly.

9. The device of claim 8 wherein the flared end portion is segmental.

10. The device of claim 8 werein the bushing consists of an electrically conductive material.

11. In a dynamo-electric machine a gas film mechanism comprising first and second relatively rotatable elements having complemental surfaces defining a load carrying fluid film region therebetween, said elements having a confined fluid passage connecting said region to the ambient atmosphere, said elements having first and second access openings at spaced locations along said passage, and first and second static electricity control means adjacent the first and second openings respectively to control be ingress of dirt into said region.

12. A dynamoelectric machine comprising, a rotor element and a stator element, said elements each having a through axial bore, the rotor element being disposed in the stator bore, said stator including an elongated cylindrically contoured pin projecting through the rotor bore, said rotor including a sleeve portion having an inner cylindrically contoured surface circumscribing and complemental to the pin surface, said surface and said pin defining a pneumodynamic load carrying film producing region therebetween, said elements including an access opening connecting said region to the atmosphere ambient to the machine, and said elements including means carried adjacent to said opening to control the ingress of dirt into said region.

13. The device of claim 4 wherein said insulating means comprises coatings of hard aluminum oxide.

14. In a dynamo-electric machine a gas film mechanism comprising, an elongated cylindrically contoured pin, an elongated sleeve telescoped over the pin to define a pneumodynamic film producing region therebetween, an end cap secured to one end of the sleeve to define a trapped pocket of air between one end of the pin and the cap, and said pin and sleeve including non-contacting dirt controlling means adjacent the end of the region remote from said cap substantially preventing the ingress of dirt through such remote end and into the region.

15. In a dynamo-electric machine a gas film mechanism comprising, an elongated cylindrically contoured pin, an elongated sleeve telescoped over the pin to define a pneumodynamic film producing region therebetween, and said pin and sleeve including non-contacting dirt controlling means adjacent at least one end of the region substantially preventing the ingress of dirt into the region.

16. The device of claim 15 wherein said means includes at least one sharp corner.

17. The device of claim 14 wherein said pin and sleeve are glass to provide said means.

18. A dynamo-electric machine including first and second relatively rotatable field and armature assemblies, said first assembly including a pin member, the second assembly including a sleeve support tube, a sleeve member supported within the tube and telescoped over the pin to define a complemental pneumodynamic load carrying film producing region therebetween, and said members including non-contacting means at at least one end of the region to substantially prevent the ingress of dirt particules into the region.

19. The article of claim 18 wherein said members are formed of an insulating material to provide said means.

20. The article of claim 19 wherein the insulating material is glass.

21. The device of claim 18 wherein an end cap is secured to the other end of the tube and spaced from the other end of the pin to define a trapped pocket of air therebetween.

References Cited in the file of this patent

UNITED STATES PATENTS

| | | |
|---|---|---|
| 1,980,081 | Ovington | Nov. 6, 1934 |
| 2,501,814 | Gillen | Mar. 28, 1950 |
| 2,627,443 | Becker | Feb. 3, 1953 |
| 2,766,695 | Gailloud | Oct. 16, 1956 |
| 2,839,696 | Dunham | June 17, 1958 |
| 2,928,960 | Macks | Mar. 15, 1960 |
| 2,932,750 | Eisenhart | Apr. 12, 1960 |
| 2,937,294 | Macks | May 17, 1960 |

FOREIGN PATENTS

| | | |
|---|---|---|
| 480,332 | Great Britain | Feb. 21, 1938 |